US012624284B2

(12) United States Patent
Prodanov et al.

(10) Patent No.: US 12,624,284 B2
(45) Date of Patent: May 12, 2026

(54) METHOD FOR PREPARING STABLE AND BRIGHT LUMINESCENT QUANTUM ROD NANOCOMPOSITES

(71) Applicant: The Hong Kong University of Science and Technology, Hong Kong (CN)

(72) Inventors: Maksym Prodanov, Hong Kong (CN); Chengbin Kang, Hong Kong (CN); Valerii Vladimirovich Vashchenko, Hong Kong (CN); Abhishek Kumar Srivastava, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 494 days.

(21) Appl. No.: 18/467,795

(22) Filed: Sep. 15, 2023

(65) Prior Publication Data

US 2024/0166946 A1 May 23, 2024

Related U.S. Application Data

(60) Provisional application No. 63/425,283, filed on Nov. 14, 2022.

(51) Int. Cl.
C09K 11/88 (2006.01)
B82Y 20/00 (2011.01)
(Continued)

(52) U.S. Cl.
CPC .......... C09K 11/883 (2013.01); C09K 11/025 (2013.01); B82Y 20/00 (2013.01); B82Y 40/00 (2013.01)

(58) Field of Classification Search
CPC ............................ C09K 11/025; C09K 11/883
See application file for complete search history.

(56) References Cited

U.S. PATENT DOCUMENTS

| | | | |
|---|---|---|---|
| 10,723,941 | B2 | 7/2020 | Banin et al. |
| 11,056,613 | B2 | 7/2021 | Prodanov et al. |
| 2012/0205598 | A1 | 8/2012 | Li et al. |

FOREIGN PATENT DOCUMENTS

| | | | |
|---|---|---|---|
| CN | 103055954 B | 3/2015 | |
| WO | WO-2005022120 A2 * | 3/2005 | ............. C30B 7/005 |

OTHER PUBLICATIONS

Chen et.al., Efficient and Stable CdSe/CdS/ZnS Quantum Rods-in-Matrix Assembly for White LED Application, Nanomaterials 2020, 10, 317.

(Continued)

*Primary Examiner* — C Melissa Koslow
(74) *Attorney, Agent, or Firm* — S&F/WEHRW

(57) ABSTRACT

Method of preparing a quantum rod nanocomposite, the method involving: combining a CdSe/CdS quantum rod, a metal ion catalyst, and a zinc precursor thereby forming a CdSe/Cd$_x$Zn$_{1-x}$S/ZnS quantum rod, wherein $0 \leq X < 1$; optionally purifying the CdSe/Cd$_x$Zn$_{1-x}$S/ZnS quantum rod; combining the CdSe/Cd$_x$Zn$_{1-x}$S/ZnS quantum rod with an inorganic oxide precursor thereby forming an inorganic oxide encapsulated CdSe/Cd$_x$Zn$_{1-x}$S/ZnS quantum rod, wherein the CdSe/Cd$_x$Zn$_{1-x}$S/ZnS quantum rod is at least partially encapsulated by an inorganic oxide coating; and optionally combining the inorganic oxide encapsulated CdSe/Cd$_x$Zn$_{1-x}$S/ZnS quantum rod with a binder thereby forming a binder coated inorganic oxide encapsulated CdSe/Cd$_x$Zn$_{1-x}$S/ZnS quantum rod and curing the binder thereby forming the quantum rod nanocomposite.

20 Claims, 6 Drawing Sheets

(51) Int. Cl.
    B82Y 40/00          (2011.01)
    C09K 11/02          (2006.01)

(56)                   References Cited

OTHER PUBLICATIONS

Adel et.al., Segmented CdSe@CdS/ZnS Nanorods Synthesized via a Partial Ion Exchange Sequence, Chemistry of Materials, 2014, 26, 3121-3127.

* cited by examiner

METHOD FOR PREPARING STABLE AND BRIGHT LUMINESCENT QUANTUM ROD NANOCOMPOSITES

CROSS-REFERENCE TO RELATED APPLICATIONS

The present application claims priority from U.S. Provisional Patent Application No. 63/425,283, filed on Nov. 14, 2022, which is hereby incorporated by reference in its entirety.

TECHNICAL FIELD

The present disclosure relates to a method of preparing a quantum rod nanocomposite.

BACKGROUND

The discovery of quantum dots (QDs) with superior optical properties, compared to conventional phosphors, resulted in a revolution in the display industry, which applies not only for LCD, but also for OLED display technology. The quantum dot backlight possesses very sharp, separately located, blue, green and red peaks boosting up the display color gamut by ~30%, which substantially improves color diversity and making it suitable for new gen ultra-HD (4K and 8K) television. Quantum dot LED (QLED) display technology's rapid commercialization resulted in a new premium product with improved performance. However, QLED technology is disadvantaged by its high price and power consumption, which result from a separate continuous film comprising the QDs within the backlight unit resulting in higher material consumption, production cost and light losses when embedded into the display. In this sense, an on-chip coating would be the most efficient configuration. In addition, it would be cheaper as a smaller amount of material is needed. Moreover, in this case, no additional film is used in the display structure. Simple replacement of backlight LEDs with QDs embedded LED would serve the purpose. Implementation of this technology is restricted by thermal quenching of quantum dots, which reduces their efficiency dramatically because of high temperature on top of LED chip.

Quantum rods are much more stable than QDs and do not show thermal quenching effect up to 160-200° C. However, two problems still hamper their extensive use as an LED down-converter. First is the long-term stability of quantum rods, which still must be improved for practical application as a down-converter in an on-chip configuration. Despite the absence of serious thermal quenching, long-term photostability of quantum rods is currently limited in the range of hours to tens of hours, depending on the testing conditions. This is far from the industry requirements and must be improved.

Another problem facing the adoption of quantum rods is complicated and irreproducible synthesis of the quantum rod material emitting in the green, cyan and blue region. Current methods involving a $Cd^{2+}$ to $Zn^{2+}$ exchange approach are very sensitive to quantum rod size, CdS shell thickness and presence of surface defects. As a result, a highly labor-intensive process is required to finally synthesize CdSe/CdS dot-in-rod material capable of undergoing the cation exchange reaction. Moreover, following the $Cd^{2+}$ to $Zn^{2+}$ exchange reaction, depending on the surface defects configuration can also proceed with a serious increase of the emission FWHM (full width at half maximum of the luminescence peak) and takes many hours at temperature~350° C. to achieve green ($\lambda_{max}$~520 nm) emitting product. Thus, overall reproducibility is rather low.

There thus exists a need to develop improved methods for preparing quantum rod nanocomposites with enhanced properties that address at least some of the shortcomings described above.

SUMMARY

Provided herein is a quantum rod down-converting nanocomposite and methods for preparation thereof, which address existing synthetic challenges and improve the quantum material photostability. First, CdSe/CdS quantum rods of the desired length and width are prepared and use it as a framework for the further controlled synthesis of quantum rods with a luminescence at any desired wavelength. This can be accomplished by controlled cation exchange reaction of $Cd^{2+}$ to $Zn^{2+}$ using a catalytic amount of a metal ion catalyst having a softness parameter less than that of one or both of $Cd^{2+}$ and $Zn^{2+}$ ions and high ion mobility. Further, to improve photoluminescence efficiency and chemical stability of the material, an additional ZnS shell is grown by adding a zinc precursor as needed. The as-prepared quantum rods are then mixed with an inorganic oxide precursor, following by formation of the said inorganic oxide material in presence of the quantum rods, thereby, encapsulating the quantum rods within inorganic oxide matrix. As the formed inorganic oxide material can porous, once obtained it can be mixed with liquid filler and the pores can be filled by multiple vacuumizing of the mixture. Finally, the liquid filler is solidified by the proper method. The as-prepared quantum rod nanocomposite has a required luminescent property and improved photostability.

In a first aspect provided herein is a method of preparing a quantum rod nanocomposite, the method comprising: combining a CdSe/CdS quantum rod, a metal ion catalyst, and a zinc precursor thereby forming a CdSe/$Cd_xZn_{1-x}$S/ZnS quantum rod, wherein $0 \leq X < 1$;

optionally purifying the CdSe/$Cd_xZn_{1-x}$S/ZnS quantum rod;

combining the CdSe/$Cd_xZn_{1-x}$S/ZnS quantum rod with an inorganic oxide precursor thereby forming an inorganic oxide encapsulated CdSe/$Cd_xZn_{1-x}$S/ZnS quantum rod, wherein the CdSe/$Cd_xZn_{1-x}$S/ZnS quantum rod is at least partially encapsulated by an inorganic oxide coating; and optionally combining the inorganic oxide encapsulated CdSe/$Cd_xZn_{1-x}$S/ZnS quantum rod with a binder thereby forming a binder coated inorganic oxide encapsulated CdSe/$Cd_xZn_{1-x}$S/ZnS quantum rod and curing the binder thereby forming the quantum rod nanocomposite.

In certain embodiments, the zinc precursor is a zinc salt.

In certain embodiments, the zinc precursor is $Zn(O(C=O)R^1)_2$, $ZnO_2(P=O)R^1$, $Zn(S(C=S)N(R^1)_2)_2$, or a mixture thereof, wherein $R^1$ is $C_1$-$C_{30}$ alkyl or $C_3$-$C_{30}$ cycloalkyl.

In certain embodiments, the metal ion catalyst comprises a metal ion selected from the group consisting of $Ti^{2+}$, $Fe^{2+}$, $Ni^{2+}$, $Hg^{2+}$, $Pb^{2+}$, $Pd^{2+}$, $Cu^+$, $Cu^{2+}$, $Ag^+$, and $Au^+$.

In certain embodiments, the metal ion catalyst comprises a metal ion selected from the group consisting of $Cu^+$, $Cu^{2+}$, $Ag^+$, and $Au^+$.

In certain embodiments, the metal ion catalyst is combined with the CdSe/CdS quantum rod before the zinc precursor is combined; or the metal ion catalyst is combined with the CdSe/CdS quantum rod after the zinc precursor is combined.

In certain embodiments, the metal ion catalyst is present at 0.01-10 mol % relative to Cd in the CdSe/CdS quantum rod.

In certain embodiments, the inorganic oxide coating comprises aluminium oxide, titanium oxide, zinc oxide, zirconium oxide, magnesium oxide, silica, or a mixture thereof.

In certain embodiments, the inorganic oxide precursor is selected from the group consisting of $Ti(OR^2)_4$, $Al(OR^2)_3$, $Si(OR^2)_4$, perhydropolysilazane, and mixtures thereof, wherein $R^2$ for each instance is independently $C_1$-$C_{10}$ alkyl.

In certain embodiments, the inorganic oxide precursor is selected from the group consisting of aluminum isopropoxide, tetraethoxysilane, and mixtures thereof.

In certain embodiments, the step of combining the CdSe/$Cd_xZn_{1-x}$S/ZnS quantum rod with the inorganic oxide precursor further comprises combining an auxiliary agent having the chemical structure: $(R^2O)_3Si—(CH_2)_nA^1$, wherein n is a whole number selected from 1-20; and $A^1$ is —$CO_2H$, —$NH_2$, —$PO(OH)_2$, or —SH; or the step of combining the CdSe/$Cd_xZn_{1-x}$S/ZnS quantum rod with the inorganic oxide precursor further comprises combining a modifying agent selected from the group consisting of an alkali hydroxide, an inorganic salt, a reducing agent, and a water absorber.

In certain embodiments, the binder is a UV curable binder or a thermal curable binder.

In certain embodiments, the binder comprises one or more monomers selected from the group consisting of acrylate, methacrylate, styrene, vinyl chloride, acrylonitrile, cyanoacrylate; and an epoxy-based binder, or the binder is a polymer selected from the group consisting of polyvinylidene chloride, nylon, ethylene-vinyl alcohol, polyvinyl fluoride, and polytetrafluoroethylene.

In certain embodiments, the binder coated inorganic oxide encapsulated CdSe/$Cd_xZn_{1-x}$S/ZnS quantum rod is exposed to a partial vacuum one or more times prior to curing the binder.

In certain embodiments, the quantum rod nanocomposite has a photoluminescence quantum yield of 77-88% and a luminescence wavelength between 460-660 nm.

In certain embodiments, the metal ion catalyst is copper (I) acetate, silver (I) acetate, silver (I) nitrate, or a mixture thereof; the zinc precursor is a zinc (II) carboxylate, a zinc (II) phosphonate, a zinc (II) dithiocarbamate, or a mixture thereof; the inorganic oxide precursor is selected from the group consisting of $Ti(OR^2)_4$, $Al(OR^2)_3$, $Si(OR^2)_4$, perhydropolysilazane, and mixtures thereof, wherein $R^2$ for each instance is independently $C_1$-$C_{10}$ alkyl; and the inorganic oxide encapsulated CdSe/$Cd_xZn_{1-x}$S/ZnS quantum rod is combined with the binder, wherein the binder the binder is a UV curable binder or a thermal curable binder; or the binder is a polymer selected from the group consisting of polyvinylidene chloride, nylon, ethylene-vinyl alcohol, polyvinyl fluoride, and polytetrafluoroethylene.

In certain embodiments, the metal ion catalyst is copper (I) acetate; the zinc precursor is $Zn(O(C═O)R^1)$, wherein $R^1$ is $C_1$-$C_{30}$ alkyl; and the inorganic oxide precursor is selected from the group consisting of $Ti(OR^2)_4$, $Si(OR^2)_4$, and mixtures thereof.

In certain embodiments, the metal ion catalyst is copper (I) acetate; the zinc precursor is zinc oleate; and the inorganic oxide precursor is $Ti(OiPr)_4$, $Si(OEt)_4$, or a mixture thereof.

In certain embodiments, the binder is a UV curable binder.

In certain embodiments, the binder coated inorganic oxide encapsulated CdSe/$Cd_xZn_{1-x}$S/ZnS quantum rod is exposed to a partial vacuum one or more times prior to curing the binder.

BRIEF DESCRIPTION OF THE DRAWINGS

The above and other objects and features of the present disclosure will become apparent from the following description of the disclosure, when taken in conjunction with the accompanying drawings.

DETAILED DESCRIPTION

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides a method of preparing a quantum rod nanocomposite, the method comprising: combining a CdSe/CdS quantum rod, a metal ion catalyst, and a zinc precursor thereby forming a CdSe/Cd$_x$Zn$_{1-x}$S/ZnS quantum rod, wherein 0≤X<1; optionally purifying the CdSe/Cd$_x$Zn$_{1-x}$S/ZnS quantum rod; combining the CdSe/Cd$_x$Zn$_{1-x}$S/ZnS quantum rod with an inorganic oxide precursor thereby forming an inorganic oxide encapsulated CdSe/Cd$_x$Zn$_{1-x}$S/ZnS quantum rod, wherein the CdSe/Cd$_x$Zn$_{1-x}$S/ZnS quantum rod is at least partially encapsulated by an inorganic oxide coating; and optionally combining the inorganic oxide encapsulated CdSe/Cd$_x$Zn$_{1-x}$S/ZnS quantum rod with a binder thereby forming a binder coated inorganic oxide encapsulated CdSe/Cd$_x$Zn$_{1-x}$S/ZnS quantum rod and curing the binder thereby forming the quantum rod nanocomposite.

Figure 1:
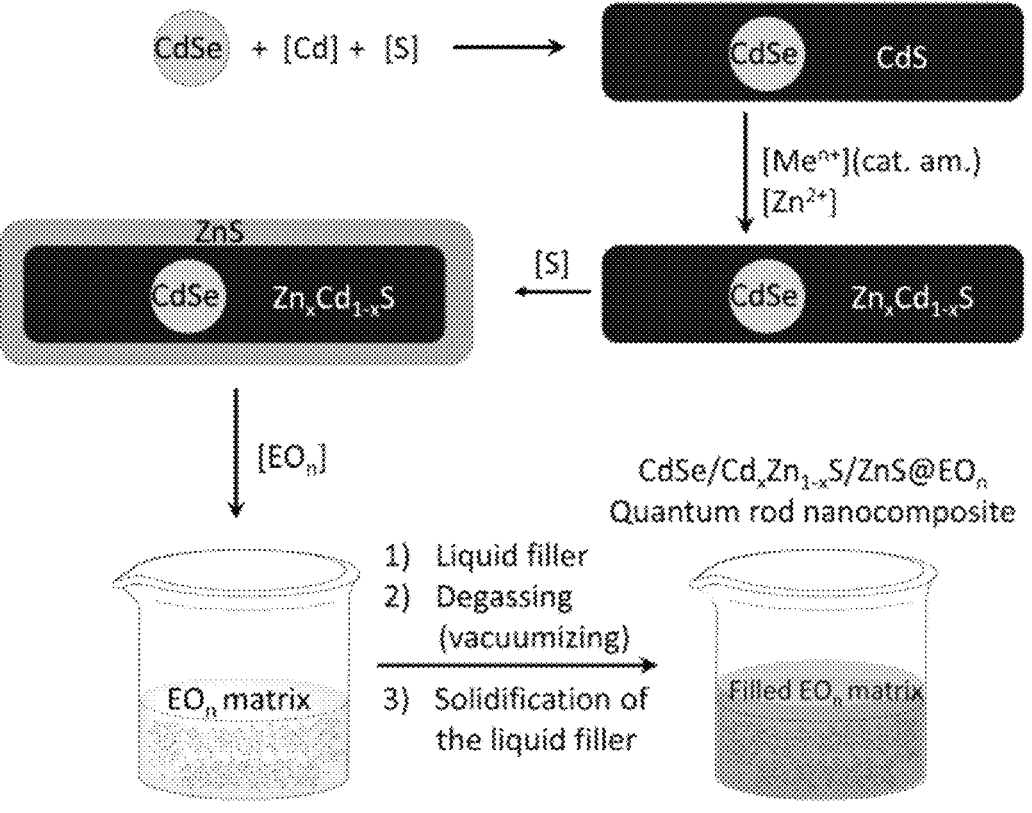
FIG. 1 depicts a schematic representation of the method for preparation of CdSe/$Cd_xZn_{1-x}$S/ZnS@$EO_n$ quantum rod nanocomposite.

FIG. 1 illustrates an exemplary reaction sequence for preparing the quantum rod nanocomposite from CdSe seeds.

CdSe/CdS quantum rods used in the examples below have a dot-in-rod morphology. However, the methods described herein can be applied to quantum rods with different morphologies, such as CdSe/CdS quantum rods with rod-in-rod morphology. One of ordinary skill in the art will appreciate that the seeds for both types (dot-in-rod and rod-in-rod) can be obtained according to known methods. Methods for preparing CdSe/CdS quantum dot-in-rods are known in the art, for example, as described in U.S. Pat. No. 11,566,613.

The CdSe/CdS quantum rods used in the methods described herein can have an average length of 10-100 nm and average width of 3-15 nm. In certain embodiments, the CdSe/CdS quantum rods have an average length of 10-90 nm, 10-80 nm, 10-70 nm, 10-60 nm, 10-50 nm, 10-40 nm, 20-40 nm, 25-35 nm, 27-33 nm, 28-32 nm, 28-31 nm, 28-30 nm, 20-32 nm, 22-30 nm, 24-28 nm, or 24-26 nm; and an average width of 3-10 nm, 4-9 nm, 4-8 nm, 4-7 nm, 4-6 nm, 5.5-6.5 nm, or 5.7-6.4 nm. In certain embodiments, the CdSe/CdS quantum rods have an average length of about 25 nm to about 29 nm and an average width of about 5.7 nm to about 6.4. The average aspect ratio of the CdSe/CdS quantum rods can range from 2-10, 2-9, 2-8, 3-8, 4-8, or 4-5. In certain embodiments, the average aspect ratio of CdSe/CdS quantum rods is about 4.39 to about 4.53, about 4.53 to about 7.83, or 4.39 to about 7.83.

The metal ion catalyst can be any metal ion with a hardness (according to Ralph Pearson's qualitative theory of hard and soft acids and bases) less than that for Cd$^{2+}$. Suitable metal ion catalysts for use in the methods described herein can comprise one or more metal ions selected from the group consisting of a group 1B, 4B, 8B, or 4A metal ion. Exemplary, metal ion catalysts include, but are not limited to Cu$^+$, Cu$^{2+}$, Ag$^+$, Au$^+$, Ti$^{2+}$, Fe$^{2+}$, Ni$^{2+}$, Hg$^{2+}$, Pb$^{2+}$, Pd$^{2+}$, or a mixture thereof.

The metal ion catalyst can comprise one or more anions. In certain embodiments, the one or more anions are selected from the group consisting of nitrate, C$_1$-C$_{12}$ alkyl carboxylate, C$_1$-C$_{12}$ alkyl phosphonate, halide (e.g., chloride, bromide, or iodide), carbonate, bicarbonate, phosphate, hydrogenphosphate, phosphite, sulfate, bisulfate, silicate, nitrite, cyanide, oxalate, and the like. In certain embodiments, the metal ion catalyst comprises copper (I) acetate, silver (I) acetate, silver (I) nitrate, or a mixture thereof.

The metal ion catalyst can be present at a mol % of 0.01-50 mol %, 0.01-45 mol %, 0.01-40 mol %, 0.01-35 mol %, 0.01-30 mol %, 0.01-25 mol %, 0.01-20 mol %, 0.01-15 mol %, 0.01-10 mol %, 0.01-9 mol %, 0.01-8 mol %, 0.01-7 mol %, 0.01-6 mol %, 0.01-5 mol %, 0.01-4 mol %, 0.01-3 mol %, 0.01-2 mol %, 0.1-2 mol %, 0.01-1 mol %, 0.05-2.5 mol %, 1-2.5 mol %, 1.5-2.5 mol %, 2-2.5 mol %, 0.5-2 mol %, 1-2 mol %, or 1-1.5 mol % relative to the Cd present in the CdSe/CdS quantum rods. In certain embodiments, the metal ion catalyst can be present at a mol % of about 2 mol % relative to the Cd present in the CdSe/CdS quantum rods.

The metal ion catalyst cation exchange reaction can proceed with a gradual hypsochromic photoluminescence wavelength shift and can be terminated at any desired wavelength value. Depending on the metal ion catalyst, the final nanorods morphology can be different varying from core (CdSe)-shell (CdS)-shell (ZnS) to core (CdSe)-homogeneous alloy shell (Cd$_x$Zn$_{1-x}$S) to core (CdSe)-gradient alloy shell (Cd$_x$Zn$_{1-x}$S).

The sequence of mixing the CdSe/CdS quantum rods with the zinc precursor and the metal ion catalyst can be varied. In certain embodiments, the zinc precursor is combined with the CdSe/CdS quantum rods prior to combining the metal ion catalyst. In certain embodiments, the metal ion catalyst is combined with the CdSe/CdS quantum rods prior to combining the zinc precursor. In yet another embodiment zinc precursor can be combined with the metal ion catalyst and then then combined with the CdSe/CdS quantum rods.

The metal ion catalyst, zinc precursor and/or CdSe/CdS quantum rods can be combined in one or more portions, wherein each of the one or more portions can be combined all at once or gradually combined over a period of time.

The zinc precursor can be a zinc (II) carboxylate, a zinc (II) phosphonate, a zinc (II) dithiocarbamate, or a mixture thereof. In certain embodiments, the zinc precursor is Zn(O(C=O)R$^1$)$_2$, ZnO$_2$(P=O)R$^1$, Zn(S(C=S)N(R$^1$)$_2$)$_2$, or a mixture thereof, wherein R$^1$ is C$_1$-C$_{30}$ alkyl, C$_1$-C$_{25}$ alkyl, C$_1$-C$_{20}$ alkyl, C$_{10}$-C$_{20}$ alkyl, C$_{15}$-C$_{20}$ alkyl, C$_1$-C$_{15}$ alkyl, C$_1$-C$_{10}$ alkyl, C$_1$-C$_5$ alkyl, C$_1$-C$_{30}$ cycloalkyl, C$_1$-C$_{25}$ cycloalkyl, C$_1$-C$_{20}$ cycloalkyl, C$_1$-C$_{15}$ cycloalkyl, C$_1$-C$_{10}$ cycloalkyl, or C$_1$-C$_5$ cycloalkyl. In certain embodiments, the zinc precursor is a zinc salt of a saturated or unsaturated fatty acid, such as a zinc (II) salt of a fatty acid selected from the group consisting of caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid.

The step of combining the CdSe/CdS quantum rods, zinc precursor, and the metal ion catalyst can be conducted at 100-400° C., 150-400° C., 200-400° C., 250-400° C., 250-350° C., 300-350° C., or 320-330° C.

The metal ion catalysed reaction of CdSe/CdS quantum rods and the zinc precursor can be conducted in any high boiling point solvent in which the starting materials are at least partially soluble and optionally one or more ligands selected from the group consisting of trioctylphosphineoxide, trioctylphosphine, and octadecylphosphonic acid. In certain embodiments, the solvent comprises a C$_{10}$-C$_{30}$ alkane, C$_{15}$-C$_{30}$ alkane, C$_{15}$-C$_{25}$ alkane, C$_{15}$-C$_{20}$ alkane, C$_{10}$-C$_{30}$ alkene, C$_{15}$-C$_{30}$ alkene, C$_{15}$-C$_{25}$ alkene, C$_{15}$-C$_{20}$ alkene, and C$_{10}$-C$_{14}$ aryl, or mixtures thereof. Exemplary solvents include, but are not limited to 1-octadecene, diisopropylbiphenyl, diisopropylnaphthalene, dibenzyl ether, paraffins, alkyl stearates, alkyl oleates, and the like.

Depending on the amount of zinc precursor combined with the CdSe/CdS quantum rod and metal ion catalyst, the resulting CdSe/Cd$_x$Zn$_{1-x}$S/ZnS quantum rod can have an X value ranging from 0 (i.e., CdSe/ZnS) to 0.99. In certain embodiments, X is 0.01 to 0.99; 0.05 to 0.99; 0.1 to 0.99; 0.2 to 0.99; 0.3 to 0.99; 0.4 to 0.99; 0.5 to 0.99; 0.6 to 0.99; 0.7 to 0.99; 0.8 to 0.99; 0.9 to 0.99; 0.95 to 0.99; 0.01 to 0.90;

0.01 to 0.80; 0.01 to 0.70; 0.01 to 0.60; 0.01 to 0.50; 0.01 to 0.40; 0.01 to 0.30; 0.01 to 0.20; 0.01 to 0.10; 0.1 to 0.90; 0.2 to 0.80; or 0.25 to 0.75.

Figure 2:
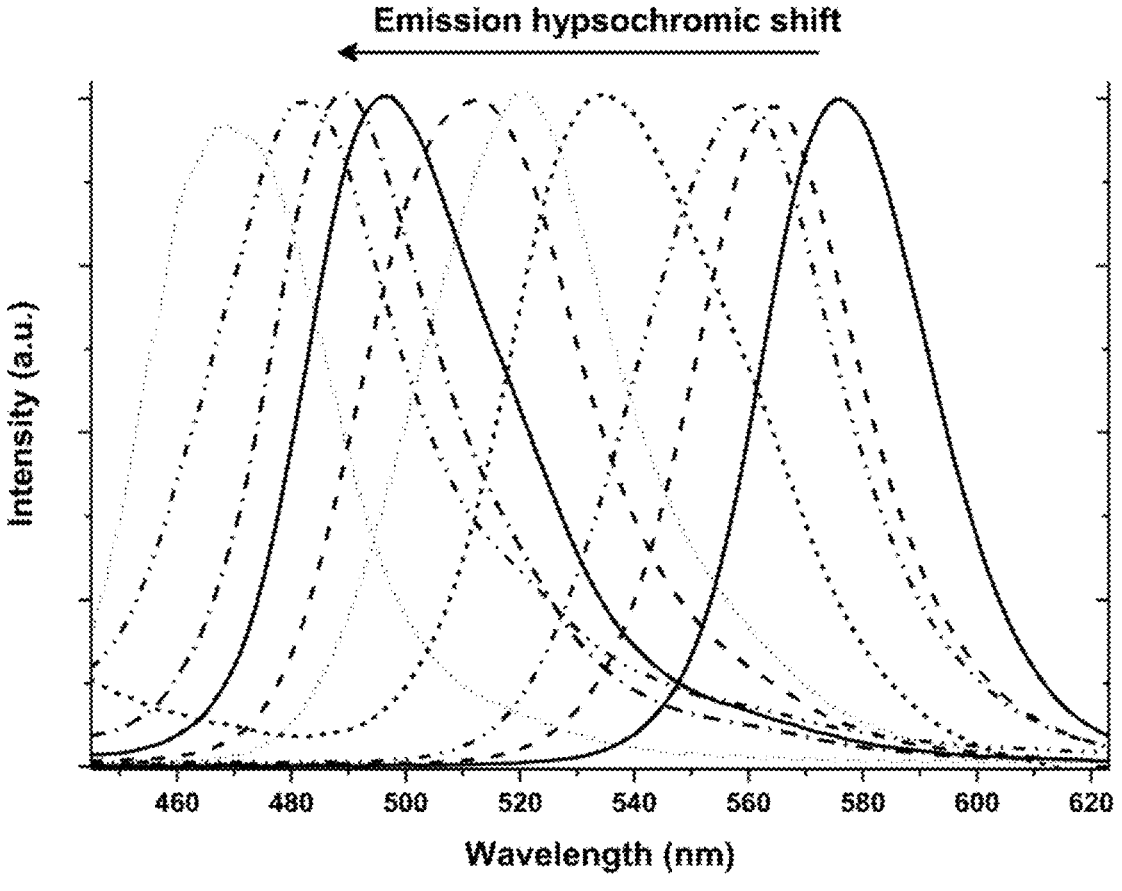
FIG. 2 depicts photoluminescence spectra of the probes taken during the synthesis of CdSe/$Cd_xZn_{1-x}$S quantum rods with copper (I) acetate metal ion catalyst (Example 1).
Figure 3:
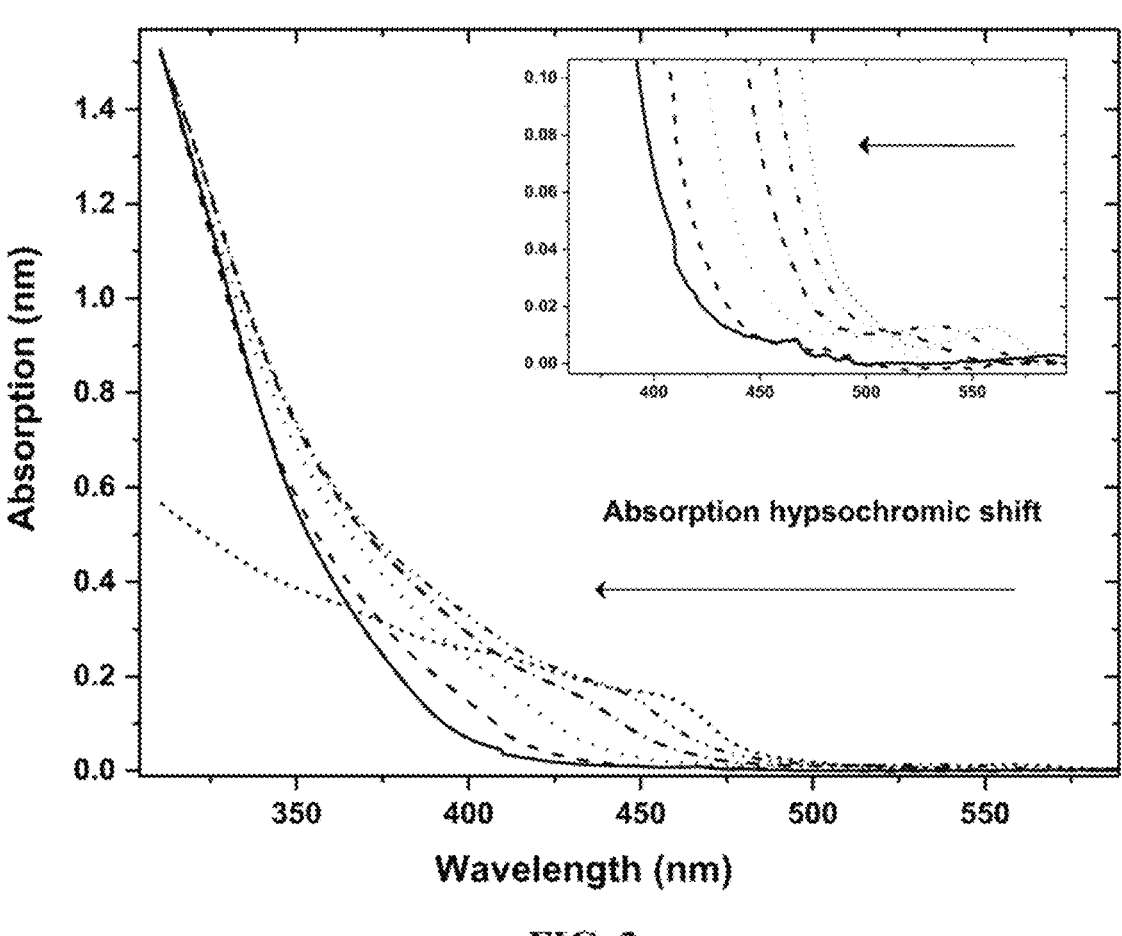
FIG. 3 depicts absorption spectra of the probes taken during the synthesis of CdSe/$Cd_xZn_{1-x}$S quantum rods with copper (I) acetate metal ion catalyst (Example 1).

As illustrated in FIGS. 2 and 3, the absorption bands and emission peaks of the quantum rod nanocomposite can vary greatly depending on the value of X, which advantageously allows the optical properties of the quantum rod nanocomposite to be tailored.

The crude $CdSe/Cd_xZn_{1-x}S/ZnS$ quantum rod can be used directly in the encapsulation step or optionally purified. In instances in which the $CdSe/Cd_xZn_{1-x}S/ZnS$ quantum rods are purified, any method useful for purifying quantum rods can be employed, such as washing with solvent, filtration, centrifugation, one or more precipitation-redispersion sequences, and the like. For precipitation, polar solvents (such as alcohols, ketones, etc.) may be used. The solvent used for precipitation should be miscible with the polar solvent(s) and be able to dissolve organic impurities, starting materials, and other contaminations. For isolation of the $CdSe/Cd_xZn_{1-x}S/ZnS$ quantum rod from this mixture, centrifugation or filtration can be used. After isolation, the $CdSe/Cd_xZn_{1-x}S/ZnS$ quantum rod can be then dissolved in a weakly polar solvent (such as aromatic and aliphatic hydrocarbons, chlorinated alkanes, etc.), which results in a solution of the desired $CdSe/Cd_xZn_{1-x}S/ZnS$ quantum rod. The latter can be purified again (to remove contaminates that may still remain) by performing another precipitation procedure and another centrifugation (or filtration) procedure. Sonication may be used to speed up the process of dissolution of reaction product.

Encapsulation of the $CdSe/Cd_xZn_{1-x}S/ZnS$ quantum rod using an inorganic oxide precursor can be accomplished using any inorganic oxide precursor that forms an inorganic oxide product (such as aluminium oxide, titanium oxide, zinc oxide, zirconium oxide, magnesium oxide) under conditions that do not substantially decompose or modify the chemical structure of the $CdSe/Cd_xZn_{1-x}S/ZnS$ quantum rod. In certain embodiments, the inorganic oxide precursor is selected from the group consisting of $Ti(OR^2)_4$, $Al(OR^2)_3$, $Si(OR^2)_4$, perhydropolysilazane, and mixtures thereof, wherein $R^2$ for each instance is independently $C_1$-$C_{10}$ alkyl, which can be converted to titania, alumina, or silica upon exposure to water. In certain embodiments, the inorganic oxide precursor is aluminum isopropoxide, tetraethoxysilane, or a mixture thereof.

The step of encapsulating the $CdSe/Cd_xZn_{1-x}S/ZnS$ quantum rod can be conducted in any solvent in which the inorganic oxide precursor is at least partially soluble. In certain embodiments, the solvent is a $C_6$-$C_{14}$, $C_6$-$C_{12}$, or $C_6$-$C_{10}$ aromatic solvent. Suitable solvents include, but are not limited to benzene, toluene, xylenes, and the like.

In certain embodiments, the step of encapsulating the $CdSe/Cd_xZn_{1-x}S/ZnS$ quantum rod using an inorganic oxide precursor can further comprise combining an auxiliary agent that can covalently modify at least one surface of the $CdSe/Cd_xZn_{1-x}S/ZnS$ quantum rod prior or concurrently with the step of encapsulating the $CdSe/Cd_xZn_{1-x}S/ZnS$ quantum rod using an inorganic oxide precursor. In such embodiments, the $CdSe/Cd_xZn_{1-x}S/ZnS$ quantum can be combined with an auxiliary agent having the chemical structure: $(R^2O)_3Si$—$(CH_2)_n A^1$, wherein n is a whole number selected from 1-20; and $A^1$ is —$CO_2H$, —$NH_2$, —PO $(OH)_2$ or —SH. In certain embodiments, the auxiliary agent is an ω-mercaptoalkyl trialkoxysilanes, such as 3-mercaptopropyl trimethoxysilane.

Figure 7:
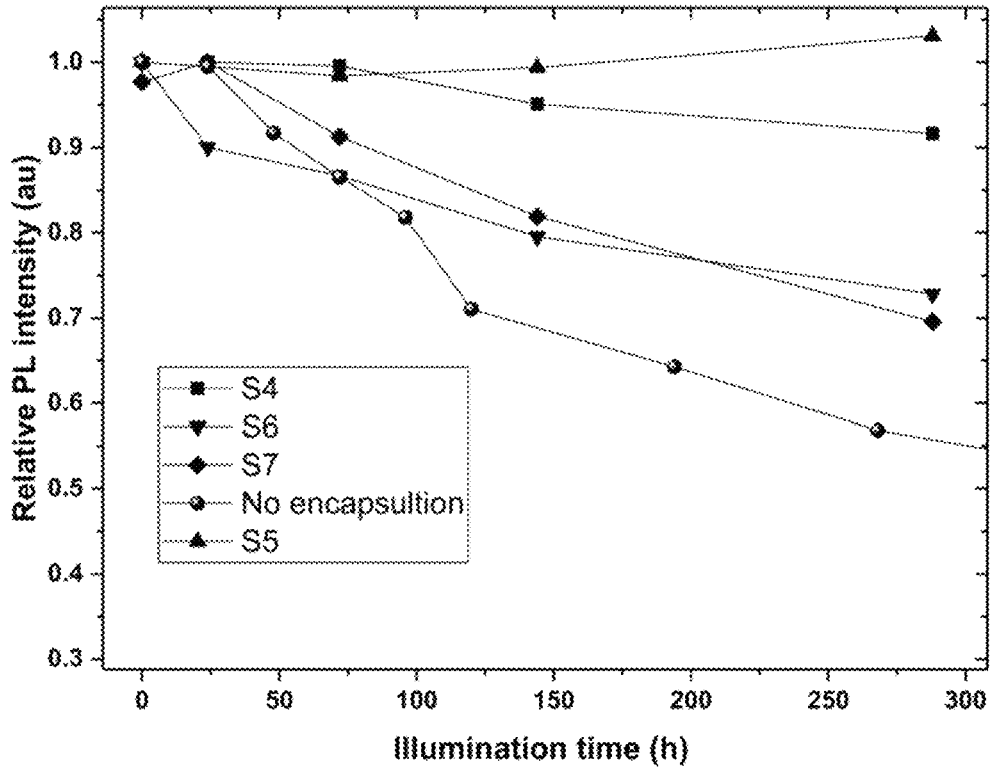
FIG. 7 depicts the results of a photostability accelerated test study for the samples from Example 9.

In certain embodiments, the step of encapsulating the $CdSe/Cd_xZn_{1-x}S/ZnS$ quantum rod using an inorganic oxide precursor can further comprise combining an encapsulation modifier that can modify the properties of the inorganic oxide encapsulating, such as hygroscopicity or oxidative stability further improving stability of the inorganic oxide encapsulated $CdSe/Cd_xZn_{1-x}S/ZnS$ quantum rods. Examples include basic compounds, such as alkali hydroxides (such as LiOH, KOH, NaOH, $Ca(OH)_2$, and $Mg(OH)_2$), inorganic salts (such as $CaCl_2$), $CaSO_4$, $Na_2SO_4$, $CaCO_3$, $CaSO_4$), reducing agents and water absorbers (such as $NaBH_4$, alkylamines, dialkylamines, trialkylamines), hydroquinone, and polyphenols. In certain embodiments the stability of such a modified inorganic oxide encapsulated $CdSe/Cd_xZn_{1-x}S/ZnS$ quantum rod is improved comparing with the one in absence of the modifiers (FIG. 7).

The surface of the inorganic oxide encapsulated $CdSe/Cd_xZn_{1-x}S/ZnS$ quantum rod can comprise a significant number of pores depending on the chemical structure of the inorganic oxide coating the method used for encapsulation. The barrier properties of the inorganic oxide encapsulated $CdSe/Cd_xZn_{1-x}S/ZnS$ quantum rod can be improved by appropriate selection of a binder to fill the pores. In certain embodiments, the binder has low gas permeability. The binder can be applied to the inorganic oxide encapsulated $CdSe/Cd_xZn_{1-x}S/ZnS$ quantum rod by combining a solution comprising the binder and optionally exposing the binder coated inorganic oxide encapsulated $CdSe/Cd_xZn_{1-x}S/ZnS$ quantum rod to a partial vacuum which can degas (removing all the gas from the pores) the pores of the binder coated inorganic oxide encapsulated $CdSe/Cd_xZn_{1-x}S/ZnS$ quantum rod thereby removing at least a portion of the gases present in the binder coated inorganic oxide encapsulated $CdSe/Cd_xZn_{1-x}S/ZnS$ quantum rod prior to curing the binder. After several vacuumizing (degassing) rounds, the pores can be filled with the binder.

In certain embodiments, the inorganic oxide encapsulated $CdSe/Cd_xZn_{1-x}S/ZnS$ quantum rod nanocomposite is milled before combining with the binder.

Binders useful in the methods described herein may take the form of curable binders, such as binders curable via energetic methods, such as e-beam, microwave, laser, and UV curing methods; via chemical methods, such as catalyst-induced or moisture-induced methods; and/or via thermal methods. Alternatively, the binder may take the form of a solution comprising one or more polymers that solidifies upon evaporation of the solvent.

The binder can comprise, for example, one or more monomers selected from the group consisting of acrylate, methacrylate, styrene, vinyl chloride, acrylonitrile, cyanoacrylate; and an epoxy-based binder; or the binder can be a polymer selected from the group consisting of polyvinylidene chloride, nylon, ethylene-vinyl alcohol, polyvinyl fluoride, and polytetrafluoroethylene. Useful UV-curable binders can comprise constituents selected from the group consisting of acrylic, methacrylic, acrylate, methacrylate, maleate, styrene, and vinyl ether oligomers and monomers. Useful oligomers include epoxy acrylates, aliphatic urethane acrylates, aromatic urethane acrylates, polyester acrylates, aromatic acid acrylates, epoxy methacrylates, and aromatic acid methacrylates. In certain embodiments, the binder comprises a UV-glue, such UV-glue sold under the tradenames NOA 60, NOA 621, NOA 63, NOA 65, NOA 68, NOA 68T, NOA 68TH, NOA 71, NOA 72, NOA 73, NOA 74, NOA 75, NOA 76, NOA 78, NOA 81, NOA 83H, NOA 84, NOA 85, NOA 85V, NOA 86, NOA 87, NOA 88, NOA 89, NOA 89H, NOA 1315, NOA 132, NOA 133, NOA 1327, NOA 1328, NOA 1348, NOA 136, NOA 13685, NOA 1369, NOA 1375, NOA 13775, NOA 138, NOA 13825, NOA 139, NOA 142, NOA 144, NOA 146H, NOA 148, NOA 1665, or NOA 170 sold by Norland™ Products. Thermally polymerizable monomers can be also used, so that the polymerization reaction is initiated by high temperature. Instead of one or more monomers, or along with the, the binder can comprise a liquid polymer dissolved in a solvent or above its melting point, so that after filling in the pores it can be solidified by cooling down to room temperature. For example, LC-polymers, PVDC, nylon, EVOH, PVF, PTFE or derivatives thereof can be used.

In certain embodiments, the binder is used in conjunction with a curing agent, which induces the binder to polymerize, crosslink or solidify. In certain embodiments, the curing agent comprises the application of energy, e.g., e-beam, microwave, laser, or UV radiation, the application of heat, reaction with a free radical initiator (such as an azo compound, a peroxide compound, a metal, and the like), moisture, or a combination thereof.

The as prepared quantum rod nanocomposite can be used directly or optionally purified. In instances in which the quantum rod nanocomposite is purified, any method useful for purifying quantum rods can be employed, such as washing with solvent, filtration, centrifugation, one or more precipitation-redispersion sequences, and the like. For precipitation, polar solvents (such as alcohols, ketones, etc.) may be used. The solvent used for precipitation should be miscible with the polar solvent(s) and be able to dissolve organic impurities, starting materials, and other contaminations. For isolation of the quantum rod nanocomposite from this mixture, centrifugation or filtration can be used. After isolation, the quantum rod nanocomposite can be then dissolved in a weakly polar solvent (such as aromatic and aliphatic hydrocarbons, chlorinated alkanes, etc.), which results in a solution of the desired quantum rod nanocomposite. The latter can be purified again (to remove contaminates that may still remain) by performing another precipitation procedure and another centrifugation (or filtration) procedure. Sonication may be used to speed up the process of dissolution of reaction product.

Quantum rod nanocomposites prepared in accordance with the methods described herein can have a photoluminescence quantum yield of 50-90%, 51-88%, 60-90%, 70-90%, 80-90%, 69-88%, 77-88%, 78-88%, 80-88%, 81-88%, 82-88%, 83-88%, 84-88%, 85-88%, 86-88%, or 87-88%.

The quantum rod nanocomposites can have a luminescence wavelength between 460-660 nm.

Example 1

CdSe/CdS quantum rods ($\lambda_{max}$=578 nm, FWHM=35 nm) were synthesized according to the known methods, such as those described in Carbone, L., et al. "Synthesis and Micrometer-Scale Assembly of Colloidal CdSe/CdS Nanorods Prepared by a Seeded Growth Approach," Nano Lett., 7(10):2942-50 (2007), which is incorporated herein by reference. To the as-prepared nanorods reaction mixture (4.0 ml, ~0.42 mmole of Cd), without an isolation and purification of the nanorods, 5.7 ml of zinc oleate solution in 1-octadecene (0.325 mmole/ml) was added at 320° C., followed by injection of 70 μl of copper (I) acetate solution in trialkylphosphine oxide (0.011 mmole/ml, <2 mol. % to Cd). The reaction mixed was continuously stirred at 320° C. for 1 hour while the probes were taken during the synthesis for control of the photoluminescence wavelength (see the FIG. 2). Then, the reaction mixture was cooled down to room temperature to stop the reaction. As it is seen from FIG. 2, the emission peak of quantum rods continuously shifts during 1 hour of the synthesis by more than ~110 nm starting from ~580 nm for initial CdSe/CdS nanorods all the way to 470 nm for the highly doped with zinc CdSe/Zn$_x$Cd$_{1-x}$S. The absorption probes are shown in FIG. 3. It is clearly seen that both absorbance bands of CdS shell (initially ~450 nm) and CdSe (~555 nm) core shifts to blue, while absorbance in UV increases which corresponds to ZnS. In a separate experiment, no hypsochromic shift was observed in the absence of the metal ion catalyst.

Example 2

Figure 4:
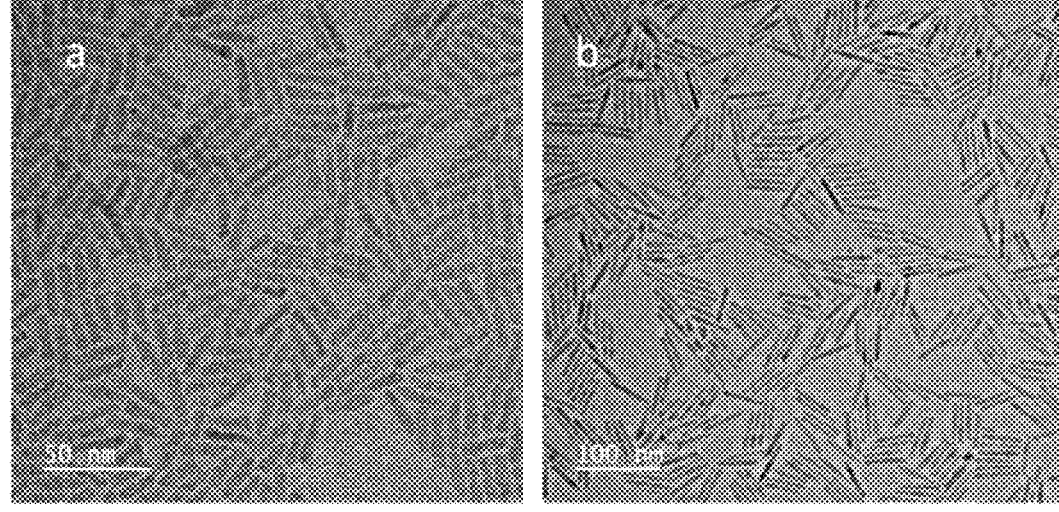
FIG. 4 depicts tunneling electron microscopy (TEM) photos of nanorods synthesized as described in Example 2.
Figure 4:
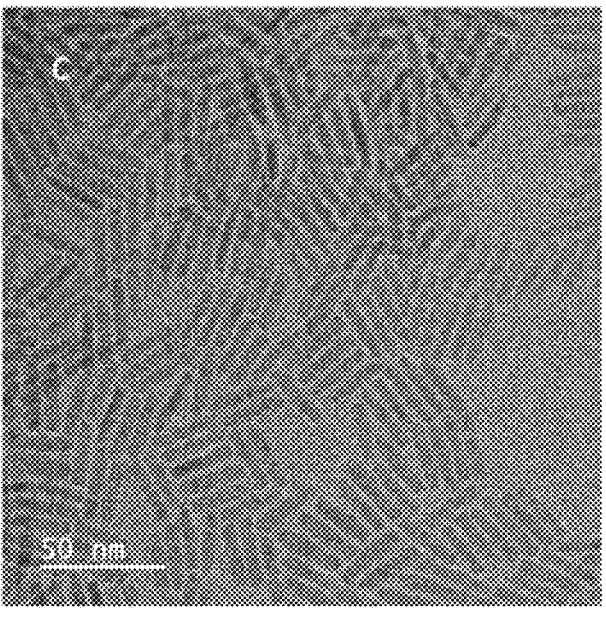

To the as prepared (see Example 1) CdSe/CdS nanorods reaction mixture (4.0 ml, ~0.42 mmole of Cd) 70 μl of copper (I) acetate solution in trialkylphosphine oxide (0.011 mmole/ml, <2 mol. % to Cd) was added. Then, 5.7 ml of zinc oleate solution in 1-octadecene (0.325 mmole/ml) was added dropwise for 2 hours at 330° C. The reaction mixture was stirred at this temperature for 30 minutes more and then cooled down to room temperature to stop the reaction. Similar to Example 1, hypsochromic shift of emission and absorption was observed. The product isolated was green emitting ($\lambda_{max}$=522 nm, FWHM=34 nm, PLQY=69%) quantum rods. TEM photo for the obtained quantum rods is shown FIG. 4a). The average length of the as prepared CdSe/Cd$_x$Zn$_{1-x}$/ZnS nanorods was 25 nm and the thickness of 5.7 nm.

Example 3

CdSe/CdS quantum rods ($\lambda_{max}$=608 nm, FWHM=30 nm) were synthesized according to the known method [Carbone, L., et al. "Synthesis and Micrometer-Scale Assembly of Colloidal CdSe/CdS Nanorods Prepared by a Seeded Growth Approach," Nano Lett., 7(10):2942-50 (2007)] as in Example 1 with a difference that different batch of bigger CdSe seeds was used for the nanorods nucleation. To the as prepared CdSe/CdS nanorods reaction mixture (4.0 ml, ~0.42 mmole of Cd) 80 μl of copper (I) acetate solution in trialkylphosphine oxide (0.011 mmole/ml, <2 mol. % to Cd) was added. Then, 5.7 ml of zinc oleate solution in 1-octadecene (0.325 mmole/ml) was added dropwise for 2 hours at 330° C. The reaction mixture was stirred at this temperature for 90 minutes more and then cooled down to room temperature to stop the reaction. Similar to Example 1, hypsochromic shift of emission and absorption was observed (608 nm→551 nm). The product isolated was yellow-greenish emitting ($\lambda_{max}$=550 nm, FWHM=36 nm, PLQY=78%) quantum rods. TEM photo for the obtained quantum rods is shown FIG. 4b. The average length of the as prepared CdSe/Cd$_x$Zn$_{1-x}$/ZnS nanorods was 29 nm and the thickness of 6.4 nm. In a separate experiment, no hypsochromic shift was observed in the absence of the metal ion catalyst.

Example 4

Figure 5:
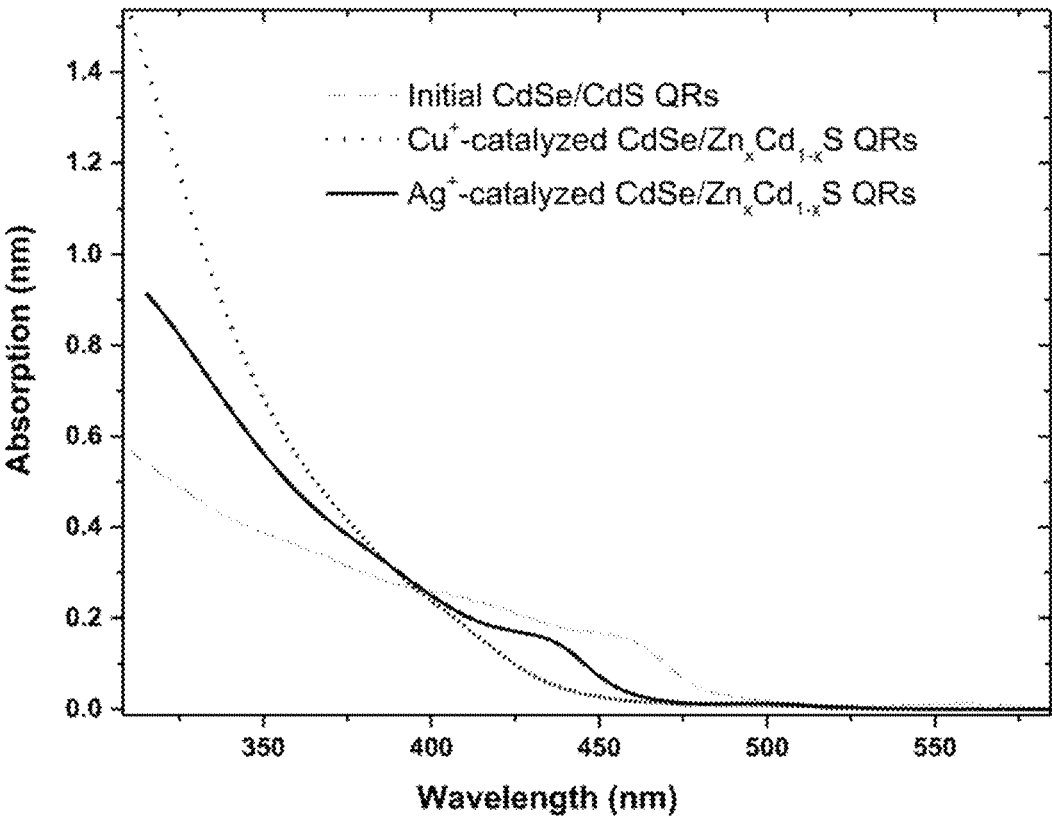
FIG. 5 depicts a comparison of absorption spectra for green-emitting CdSe/$Cd_xZn_{1-x}$S quantum rods synthesized with metal ion catalysts comprising $Cu^+$ and $Ag^+$.

To the as prepared (see Example 1) CdSe/CdS nanorods reaction mixture (4.0 ml, ~0.42 mmole of Cd) 140 μl (<2 mol. % to Cd) of silver nitrate solution in trialkylphosphine oxide (0.011 mmole/ml, contains also ~0.03 mmole/ml of oleic acid) was added. Then, 5.7 ml of zinc oleate solution in 1-octadecene (0.325 mmole/ml) was added dropwise during 2 hours at 330° C. The reaction mixture was stirred at 330° C. for 1 hour more and then cooled down to room temperature to stop the reaction. Similar to Example 1, hypsochromic shift of emission and absorption was observed. However, in contrast to Example 1 and all other $Cu^+$-catalyzed examples, a more pronounced CdS peak was present in the absorption spectra even for the green-emitting rods (see comparison for the $Cu^+$ and $Ag^+$-catalyzed quantum rods in FIG. 5), suggesting different structures of the outer $Zn_xCd_{1-x}S$ shell for these two types of nanorods. Based on these data, it is reasonable to assume that more homogenous $Zn_xCd_{1-x}S$ alloy forms in case of $Cu^+$ metal ion catalyst, whereas in case of $Ag^+$ gradient alloy structure is dominant. The product isolated was green emitting ($\lambda_{max}$=518 nm, FWHM=44 nm, PLQY=88%) quantum rods. TEM photo for the obtained quantum rods is shown FIG. 4c). The average length of the prepared $CdSe/Cd_xZn_{1-x}/ZnS$ nanorods was 47 nm and the thickness of 6.0 nm.

Similar experiment was separately performed with all the same amounts except that the silver nitrate solution in trialkylphosphine oxide was directly mixed with zinc oleate solution in 1-octadecene and the resulting mixture was added dropwise during 2 hours at 330° C. After the termination of reaction (turn off the heating) when $\lambda_{max}$ of PL emission approached ~517 nm, the nanorods were isolated, and characterized ($\lambda_{max}$=517 nm, FWHM=34 nm, PLQY=93%). This data suggests that mixing of metal catalyzer with Zn-precursor results in smoother process and better optical properties of final nanorods.

Example 5

To the as-prepared (see Example 1) CdSe/CdS nanorods reaction mixture (3.0 ml, ~0.27 mmole of Cd), without an isolation and purification of the nanorods, 3.7 ml of zinc oleate solution in 1-octadecene (0.325 mmole/ml) was added at 320° C., following by injection of 140 µl (<2 mol. % to Cd) silver nitrate solution in trialkylphosphine oxide (0.011 mmole/ml, contains also ~0.03 mmole/ml of oleic acid). The reaction mixed was continuously stirred at 320° C. for 1 hour while the probes were taken during the synthesis for control of the photoluminescence wavelength. Similar to Example 1, hypsochromic shift of emission and absorption was observed. The product isolated was green emitting ($\lambda_{max}$=519 nm, FWHM=38 nm, PLQY=77%) quantum rods.

Example 6

All the procedures are the same as in Example 1 except of that the zinc acetate solution in TRPO was used instead of zinc oleate solution in 1-octadecene. Similar to Example 1, hypsochromic shift of emission and absorption was observed. The product isolated after 1 hour was green emitting ($\lambda_{max}$=525 nm, FWHM=33 nm, PLQY=51%) quantum rods.

Example 7

All the procedures are the same as in Example 2 except of that less amount of the metal ion catalyst (50 µl) was introduced. Similar to Example 1, hypsochromic shift of emission and absorption was observed, which, however stopped when emission approached ~516 nm. At this point, ~1.0 ml of sulfur solution in trioctylphoshine (C=60 g/l)

was added dropwise for 15 minutes, and the reaction was continued for 80 minutes more. The isolated product was still green emitting ($\lambda_{max}$=515 nm, FWHM=35 nm, PLQY=86%) quantum rods with additional ZnS shell and, thereby, increased quantum yield compared to Example 2 wherein no additional ZnS shell was introduced. The as prepared $CdSe/Zn_xCd_{1-x}S/ZnS$ quantum rods, after purification, were dissolved in toluene with concentration of 22 g/L.

Separately, similar experiment with a difference that more amount of the metal ion catalyst (125 µl, ~3.5 mol. % to Cd) was introduced. Although the faster hypsochromic shift was observed (515 nm wavelength achieved in around 40 min., comparing with ~2 hours in Example 2), the PLQY of the final product decreased to 44%.

Example 8

The as prepared $CdSe/Zn_xCd_{1-x}S/ZnS$ quantum rods, after purification, were dissolved in toluene with concentration of 22 g/L. Three aliquots of this solution (0.5 ml each) was mixed separately with:

1) 110 mg (0.54 mmole) of aluminum isopropoxide and 112 mg (0.54 mmole) of tetraethoxysilane (corresponds to S1 sample).

2) 120 mg (0.59 mmole) of aluminum isopropoxide (corresponds to S2 sample).

3) 108 mg (1 mmole) of tetraethoxysilane (corresponds to S3 sample).

The mixtures were left at room temperature under ambient conditions for 72 hours until the toluene evaporates, and the corresponding inorganic $EO_n$ oxide formed as a hard solid tablet on bottom of the vial. These materials were milled manually with pestle in the mortar and dried in vacuum for 40 minutes at room temperature and 90 minutes at 100° C. The samples were, then, divided on two batches and mixed with UV-glue sold under the tradename Norland Optical Adhesive 61 (NOA 61) by Norland™ Products.

From the first set, after thorough mixing the powder with UV-glue, 2 mg of the obtained mixture was placed on top of commercial blue LED chip and polymerized by UV-light irradiation for 20 minutes.

For the second batch, after mixing with UV-glue, vacuum (~0.01 bar) was applied for 5 minutes followed by filling with air and this procedure was repeated for 5 times. Finally, the mixture (the same amount as for the first batch, ~2 mg) was placed on top of commercial blue LED chip and polymerized by UV-light irradiation for 30 minutes. These samples are referred as S1-vac, S2-vac and S3-vac. No additional encapsulation has been applied for the prepared LED packages.

Figure 6:
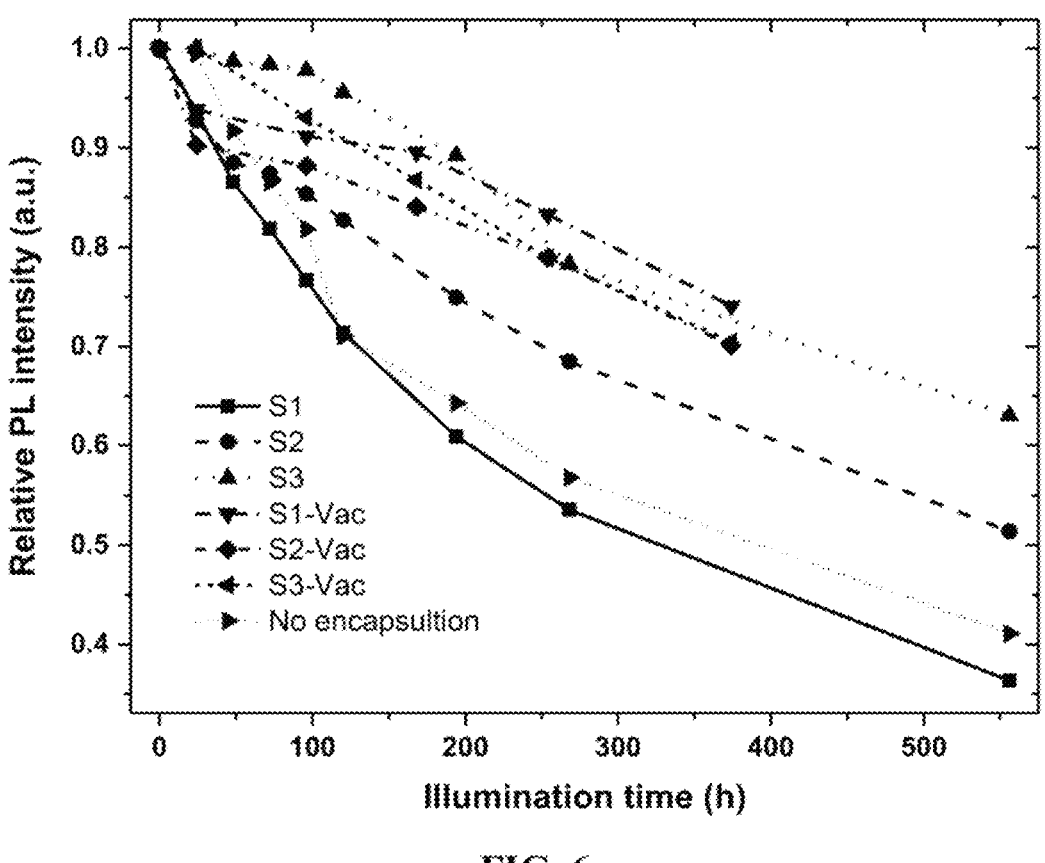
FIG. 6 depicts the results of a photostability accelerated test study for the samples from Example 8.

The corresponding LED packages were tested under continuous blue light (450 nm) irradiation at ambient conditions. The results for the photoluminescence peak integrated intensity are presented in FIG. 6 and summarized in the table below. It is seen that photostability of the quantum rods has considerably improved compared to the nanorods with no inorganic oxide encapsulation. At the same time, the degassed (vacuumized) samples show better stability compared to those with this step skipped.

| | Relative intensity | | | | | Relative intensity | | |
|---|---|---|---|---|---|---|---|---|
| Time | | | | No | Time | | | |
| (hours) | S1 | S2 | S3 | encapsulation | (hours) | S1-Vac | S2-Vac | S3-Vac |
| 0 | 1.00 | 1.00 | 1.00 | 1.00 | 0 | 1.00 | 1.00 | 1.00 |
| 24 | 0.94 | 0.93 | 1.00 | 0.99 | 24 | 0.94 | 0.90 | 1.00 |
| 48 | 0.87 | 0.88 | 0.99 | 0.92 | 96 | 0.91 | 0.88 | 0.93 |
| 72 | 0.82 | 0.87 | 0.98 | 0.87 | 168 | 0.90 | 0.84 | 0.87 |
| 96 | 0.77 | 0.85 | 0.98 | 0.82 | 254 | 0.83 | 0.79 | 0.79 |
| 120 | 0.71 | 0.83 | 0.96 | 0.71 | 374 | 0.74 | 0.70 | 0.70 |
| 194 | 0.61 | 0.75 | 0.89 | 0.64 | | | | |
| 268 | 0.54 | 0.68 | 0.78 | 0.57 | | | | |
| 556 | 0.36 | 0.51 | 0.63 | 0.41 | | | | |

Example 9

In this Example, Example 2 (S1) was set as a basis and different modifiers were added to the initial mixture for improvement of the inorganic oxide encapsulating properties and/or basic or hygroscopic properties, serving as a desiccant or oxygen scavenger (antioxidant) further improving stability of the quantum rods.

All the procedures are the same as in Example 2 (for S1) except of that initially, together with 110 mg (0.54 mmole) of aluminum isopropoxide and 112 mg (0.54 mmole) of tetraethoxysilane two different encapsulation modifiers and two different auxiliary agents separately were added:

1) 60 mkl (0.58 mmole) of diethtylamine encapsulation modifier (for S4 sample).
2) 146 mkl (0.58 mmole) of sodium borohydride ($NaBH_4$) encapsulation modifier (for S5 sample).
3) 20 mg (84 mkmole) of mercapropyltriethoxysilane auxiliary agent (for S6 sample).
4) 25 mg (0.11 mmole) of 11-mercaptoundecanoic acid auxiliary agent (for S7 sample).

All subsequent procedures are the same as in Example 7 (including vacuumizing after mixing with the liquid filler) and these samples were tested in the conditions using the same blue LEDs (see results on FIG. 7).

What is claimed is:

1. A method of preparing a quantum rod nanocomposite, the method comprising:
combining a CdSe/CdS quantum rod, a metal ion catalyst, and a zinc precursor thereby forming a CdSe/Cd$_x$ Zn$_{1-x}$S/ZnS quantum rod, wherein 0≤X<1;
optionally purifying the CdSe/Cd$_x$Zn$_{1-x}$S/ZnS quantum rod;
combining the CdSe/Cd$_x$Zn$_{1-x}$S/ZnS quantum rod with an inorganic oxide precursor thereby forming an inorganic oxide encapsulated CdSe/Cd$_x$Zn$_{1-x}$S/ZnS quantum rod, wherein the CdSe/Cd$_x$Zn$_{1-x}$S/ZnS quantum rod is at least partially encapsulated by an inorganic oxide coating; and
optionally combining the inorganic oxide encapsulated CdSe/Cd$_x$Zn$_{1-x}$S/ZnS quantum rod with a binder thereby forming a binder coated inorganic oxide encapsulated CdSe/Cd$_x$Zn$_{1-x}$S/ZnS quantum rod and curing the binder thereby forming the quantum rod nanocomposite.

2. The method of claim 1, wherein the zinc precursor is a zinc salt.

3. The method of claim 1, wherein the zinc precursor is $Zn(O(C═O)R^1)_2$, $ZnO_2(P═O)R^1$, $Zn(S(C═S)N(R^1)_2)_2$, or a mixture thereof, wherein $R^1$ is $C_1$-$C_{30}$ alkyl or $C_3$-$C_{30}$ cycloalkyl.

4. The method of claim 1, wherein the metal ion catalyst comprises a metal ion selected from the group consisting of $Ti^{2+}$, $Fe^{2+}$, $Ni^{2+}$, $Hg^{2+}$, $Pb^{2+}$, $Pd^{2+}$, $Cu^+$, $Cu^{2+}$, $Ag^+$, and $Au^+$.

5. The method of claim 1, wherein the metal ion catalyst comprises a metal ion selected from the group consisting of $Cu^+$, $Cu^{2+}$, $Ag^+$, and $Au^+$.

6. The method of claim 1, wherein the metal ion catalyst is combined with the CdSe/CdS quantum rod before the zinc precursor is combined; or the metal ion catalyst is combined with the CdSe/CdS quantum rod after the zinc precursor is combined.

7. The method of claim 1, wherein the metal ion catalyst is present at 0.01-10 mol % relative to Cd in the CdSe/CdS quantum rod.

8. The method of claim 1, wherein the inorganic oxide coating comprises aluminium oxide, titanium oxide, zinc oxide, zirconium oxide, magnesium oxide, silica, or a mixture thereof.

9. The method of claim 1, wherein the inorganic oxide precursor is selected from the group consisting of Ti(OR$^2$)$_4$, Al(OR$^2$)$_3$, Si(OR$^2$)$_4$, perhydropolysilazane, and mixtures thereof, wherein R$^2$ for each instance is independently $C_1$-$C_{10}$ alkyl.

10. The method of claim 1, wherein the inorganic oxide precursor is selected from the group consisting of aluminum isopropoxide, tetraethoxysilane, and mixtures thereof.

11. The method of claim 1, wherein the step of combining the CdSe/Cd$_x$Zn$_{1-x}$S/ZnS quantum rod with the inorganic oxide precursor further comprises combining an auxiliary agent having the chemical structure: (R$^2$O)$_3$Si—(CH$_2$)$_n$A$^1$, wherein n is a whole number selected from 1-20; and A$^1$ is —CO$_2$H, —NH$_2$, —PO(OH)$_2$, or —SH; or the step of combining the CdSe/Cd$_x$Zn$_{1-x}$S/ZnS quantum rod with the inorganic oxide precursor further comprises combining a modifying agent selected from the group consisting of an alkali hydroxide, an inorganic salt, a reducing agent, and a water absorber.

12. The method of claim 1, wherein the binder is a UV curable binder or a thermal curable binder.

13. The method of claim 1, wherein the binder comprises one or more monomers selected from the group consisting of acrylate, methacrylate, styrene, vinyl chloride, acrylonitrile, cyanoacrylate; and an epoxy-based binder; or the binder is a polymer selected from the group consisting of polyvinylidene chloride, nylon, ethylene-vinyl alcohol, polyvinyl fluoride, and polytetrafluoroethylene.

14. The method of claim 1, wherein the binder coated inorganic oxide encapsulated CdSe/Cd$_x$Zn$_{1-x}$S/ZnS quantum rod is exposed to a partial vacuum one or more times prior to curing the binder.

15. The method of claim 1, wherein the quantum rod nanocomposite has a photoluminescence quantum yield of 77-88% and a luminescence wavelength between 460-660 nm.

16. The method of claim 1, wherein the metal ion catalyst is copper (I) acetate, silver (I) acetate, silver (I) nitrate, or a mixture thereof; the zinc precursor is a zinc (II) carboxylate, a zinc (II) phosphonate, a zinc (II) dithiocarbamate, or a mixture thereof; the inorganic oxide precursor is selected from the group consisting of $Ti(OR^2)_4$, $Al(OR^2)_3$, $Si(OR^2)_4$, perhydropolysilazane, and mixtures thereof, wherein $R^2$ for each instance is independently $C_1$-$C_{10}$ alkyl; and the inorganic oxide encapsulated $CdSe/Cd_xZn_{1-x}S/ZnS$ quantum rod is combined with the binder, wherein the binder the binder is a UV curable binder or a thermal curable binder; or the binder is a polymer selected from the group consisting of polyvinylidene chloride, nylon, ethylene-vinyl alcohol, polyvinyl fluoride, and polytetrafluoroethylene.

17. The method of claim 16, wherein the metal ion catalyst is copper (I) acetate; the zinc precursor is $Zn(O(C=O)R^1)$, wherein $R^1$ is $C_1$-$C_{30}$ alkyl; and the inorganic oxide precursor is selected from the group consisting of $Ti(OR^2)_4$, $Si(OR^2)_4$, and mixtures thereof.

18. The method of claim 16, wherein the metal ion catalyst is copper (I) acetate; the zinc precursor is zinc oleate; and the inorganic oxide precursor is $Ti(OiPr)_4$, $Si(OEt)_4$, or a mixture thereof.

19. The method of claim 18, wherein the binder is a UV curable binder.

20. The method of claim 19, wherein the binder coated inorganic oxide encapsulated $CdSe/Cd_xZn_{1-x}S/ZnS$ quantum rod is exposed to a partial vacuum one or more times prior to curing the binder.

* * * * *